(12) United States Patent
Veyrieres (10) Patent No.: US 11,186,348 B2
(45) Date of Patent: Nov. 30, 2021

(54) FLOATING STRUCTURE COMPRISING A PLURALITY OF MODULAR FLOATING BLOCKS

(71) Applicant: CUBISYSTEM, Portbail (FR)

(72) Inventor: Philippe Veyrieres, Portbail (FR)

(73) Assignee: CUBISYSTEM, Portbail (FR)

( * ) Notice: Subject to any disclaimer, the term of this patent is extended or adjusted under 35 U.S.C. 154(b) by 0 days.

(21) Appl. No.: 16/822,338

(22) Filed: Mar. 18, 2020

(65) Prior Publication Data
US 2020/0298939 A1  Sep. 24, 2020

(30) Foreign Application Priority Data
Mar. 20, 2019 (FR) ...................................... 1902863

(51) Int. Cl.
 *B63B 35/44* (2006.01)
 *B63B 35/38* (2006.01)
 *B63B 35/32* (2006.01)

(52) U.S. Cl.
CPC .............. *B63B 35/44* (2013.01); *B63B 35/38* (2013.01); *B63B 35/32* (2013.01); *B63B 2035/4453* (2013.01); *B63B 2221/08* (2013.01)

(58) Field of Classification Search
CPC ......... B63B 35/00; B63B 35/34; B63B 35/38; B63B 35/44; B63B 2221/08; B63C 1/00; B63C 1/02; E02B 15/00; E02B 15/04
USPC ............................. 114/266, 267; 405/70, 224
See application file for complete search history.

(56) References Cited

U.S. PATENT DOCUMENTS

| | | | | |
|---|---|---|---|---|
| 4,604,962 A | * | 8/1986 | Guibault | B63B 35/38 114/266 |
| 5,183,001 A | * | 2/1993 | Stranzinger | B63B 35/38 114/266 |
| 5,529,013 A | * | 6/1996 | Eva, III | B63B 35/38 114/266 |
| 5,690,523 A | * | 11/1997 | Yu | B63B 3/06 114/266 |
| 5,931,113 A | * | 8/1999 | Eva, III | B63B 35/38 114/266 |
| 6,033,151 A | * | 3/2000 | Tsou | B63B 35/38 114/266 |
| 7,213,531 B2 | * | 5/2007 | Ahern | B63C 1/02 114/267 |
| 7,426,898 B1 | * | 9/2008 | Ahern | B63C 1/02 114/267 |
| 8,037,837 B2 | * | 10/2011 | La Violette | B63C 1/02 114/263 |

(Continued)

FOREIGN PATENT DOCUMENTS

FR 2960210 A1 11/2011

*Primary Examiner* — Lars A Olson
(74) *Attorney, Agent, or Firm* — Notaro, Michalos & Zaccaria P.C.

(57) ABSTRACT

A floating structure having at least one row of floating rectangular parallelepipedal modular blocks, one block having four vertical peripheral faces that meet at four vertical edges, each vertical edge bearing an assembly lug in which an assembly system can be received in order to join the block to one or more adjacent blocks, each row having a plurality of blocks joined to one another by assembly systems arranged in two diagonally opposite lugs of each block, with the exception of two end blocks, the floating structure being configured so that each block is joined to an adjacent block by a single assembly lug.

12 Claims, 5 Drawing Sheets

(56) References Cited

U.S. PATENT DOCUMENTS 8,790,039 B2 * 7/2014 Veyrieres ................ B63B 35/38
405/70

* cited by examiner

FLOATING STRUCTURE COMPRISING A PLURALITY OF MODULAR FLOATING BLOCKS

TECHNICAL FIELD

The invention relates to the field of modular floating blocks intended to form, by assembly, floating structures, and to the floating structures obtained with such floating blocks. These floating structures have multiple applications such as, in particular, anti-intrusion barriers, anti-pollution barriers, photovoltaic power stations or even floating wave-screen and swell attenuator assemblies.

TECHNOLOGICAL BACKGROUND

Floating structures are known, for example from document FR2699495. Structures of this kind comprise a plurality of rows of floating modular cubic blocks. The blocks are joined together so as to create a floating surface that permits the movement of people, devices or the support of devices.

Each block comprises, on its vertical edges, an assembly lug by which it is possible to join adjacent blocks to one another. In the floating structure described in this document, four assembly lugs belonging to four adjacent blocks are superposed and joined together by means of a locking key. The locking key passes through the receptacles of each one of the four assembly lugs and locks the four assembly lugs with respect one another. Moreover, two adjacent blocks forming the outer contour of the floating structure are also attached to one another by means of an attachment device at the assembly lugs, located on the kerb of the floating structure. Thus, each block is joined to an adjacent block by two of its assembly lugs such that two peripheral lateral faces of these blocks are parallel and juxtaposed.

Thus, this document describes a floating structure where the modular floating blocks are attached at least in pairs or even in fours so as to form said structure. In such a structure, it is therefore necessary to have a large number of floating blocks to form an elongate floating structure. To cover a length L with a structure described in this document, at least one row of floating blocks having side dimension C is required. Moreover, the blocks are assembled such that four blocks joined to one another have a length equal to 2C. Thus, in order to cover the length L, N=L/C blocks per row are required, that is to say at least 2N blocks in total.

Moreover, an assembly of this kind makes it possible to create only a structure made up of parallel and/or perpendicular linear portions, such that it is difficult to adapt to the topology of the area that is to be equipped with such a structure.

SUMMARY

The invention is based on the idea of reducing the number of floating blocks to form a floating structure.

The invention is also based on the idea of facilitating the implementation and assembly of a floating structure.

The invention is also based on the idea of creating a floating structure that is easily adaptable, for example to the configuration of a body of water.

According to one embodiment, the invention provides a floating structure comprising at least one row of floating rectangular parallelepipedal modular blocks, one block comprising four vertical peripheral faces that meet at four vertical edges, each vertical edge bearing an assembly lug in which an assembly system can be received in order to join said block to one or more adjacent blocks, said or each row comprising a plurality of blocks joined to one another by assembly systems arranged in two diagonally opposite assembly lugs of each block, with the exception of two end blocks, said floating structure being configured such that each block is joined to an adjacent block by a single assembly lug.

By virtue of these features, arranging the blocks of the floating structure by assembling them on their diagonal and reducing the number of assembly systems between two adjacent blocks serves to greatly reduce the number of blocks required for assembling a floating structure of this kind. Moreover, such a structure is more adaptable and easier to implement. Indeed, since each block of the row is joined to an adjacent block using just one assembly lug, the angle of inclination of two adjacent blocks of a row can thus vary, as required, from −90° to +90°. This means that the floating structure can adopt curved shapes so as to adapt to requirements.

To cover a length L with the structure of the invention, it is possible to use a single row of blocks. Moreover, since the adjacent blocks are joined on their diagonal, the length to be taken into account for a block of the structure is therefore the length of the diagonal. Thus, to cover the length L if the blocks are of square section, $M=L/(\sqrt{2}\times C)$ blocks per row will be required, that is to say a minimum of M blocks, M being necessarily smaller than N of the prior art.

For example, in order to reach a length of 10 m of a floating structure using square-section blocks of side length 1 m, the prior art document requires the use of 20 blocks. The invention, by contrast, makes it possible to use a row of just 7 blocks to achieve a 10 m-long structure, that is to say a reduction of 65% in the number of required blocks.

According to one embodiment, the floating structure consists of a single row of floating blocks such that each block is connected to at most two adjacent blocks.

According to one embodiment, each assembly lug is joined to at most just one other assembly lug.

According to one embodiment, the assembly system is configured to permit rotation about a vertical axis at the connection between the two adjacent blocks.

Thus, by virtue of the assembly system the connection between two adjacent blocks is less constrained during use. Moreover, the freedom in rotation makes it possible to more easily arrange the angle of inclination between two adjacent blocks.

According to one embodiment, two adjacent, joined-together blocks of a row have two superposed assembly lugs, and the assembly lugs have a receptacle, with the assembly system passing through the receptacles of the superposed assembly lugs in order to join the blocks to one another, This means that the joining of two adjacent blocks is facilitated.

According to one embodiment, the assembly system comprises a nut and a screw provided with a screw head, the screw passing through the two receptacles of the assembly lugs such that the screw head and the nut sandwich the assembly lugs in order to secure two adjacent blocks. Alternatively, the screw can be replaced for example with a threaded rod and another nut, or with any other connector, for example made of metal or of plastic.

According to one embodiment, the assembly system comprises a cylinder placed around the screw at the level of the assembly lugs, the cylinder having an external diameter that is smaller than an internal diameter of the receptacles so as to allow sliding between the cylinder and a peripheral wall of the receptacle.

Thus, the cylinder serves to limit the radial movement of the connection between two adjacent blocks while leaving the assembly system free to rotate, about the vertical axis, with respect to the assembly lugs.

According to one embodiment, the cylinder has a length greater than a thickness of the superposed two assembly lugs and the assembly system comprises at least one washer positioned between the screw head and a first end of the cylinder, and at least one washer positioned between the nut and a second end of the cylinder, the washers having an external diameter that is greater than the internal diameter of the receptacle.

Thus, the washers make it possible to exert the clamping force of the screw/nut system on the cylinder in order to retain the rotation, about the vertical axis, of the two adjacent blocks while locking the assembly lugs against one another.

According to one embodiment, blocks located on an outer perimeter of the floating structure are connected to one another by an orientation control device, the orientation control device being secured to the blocks of the outer perimeter on an assembly lug that projects out from the floating structure, and the orientation control device being configured to adjust a general orientation of the floating structure.

The orientation control device also serves to maintain this orientation by limiting the variation in the distance between two assembly lugs of two adjacent blocks. Indeed, by setting the length of the orientation control device, it is possible to adjust the distance between two assembly lugs of two adjacent blocks, and thus to adjust the orientation of these two blocks with respect to one another.

According to one embodiment, the orientation control device comprises a rigid or tensioned element that connects the assembly lug projecting out from the floating structure of the blocks of the outer perimeter.

According to one embodiment, the orientation control device is located on at least two opposite edges of the outer perimeter of the floating structure.

According to one embodiment, the floating structure comprises at least two orientation control devices on either side of the floating structure.

According to one embodiment, the orientation control device comprises at least one cord or at least one cable or at least one bar or at least one chain.

According to one embodiment, the assembly lugs of each block consist of a first assembly lug, a second assembly lug, a third assembly lug that is diagonally opposite the first assembly lug and a fourth assembly lug that is diagonally opposite the second assembly lug, and the first assembly lug and the second assembly lug are positioned at a different height, in the vertical direction, to the third assembly lug and the fourth assembly lug such that the first assembly lug or the second assembly lug of a block can be superposed with the third assembly lug or the fourth assembly lug of an adjacent block.

Thus, the arrangement of the assembly lugs serves to facilitate the joining of two adjacent blocks without it being necessary to incline one block with respect to another.

According to one embodiment, the floating structure comprises a plurality of parallel rows of blocks, two adjacent rows being joined to one another by at least one attachment system, the attachment system joining two assembly lugs, one being located on a block of one of the adjacent rows and the other on a block of the other of the adjacent rows, said two assembly lugs being different assembly lugs to those used for joining the blocks of a given row.

Thus, one row is joined to an adjacent row while avoiding one assembly lug being used to attach to two assembly lugs of two adjacent blocks.

According to one embodiment, the floating structure comprises one or more anchoring systems which serve to anchor the floating structure to a seabed, the anchoring system being attached to one assembly lug of the floating structure, or the anchoring systems being attached to a plurality of assembly lugs distributed over a length of the floating structure.

According to one embodiment, the structure comprises a piece of protective equipment extending in a longitudinal direction of the at least one row, and forming a protective surface, the protective equipment being attached to a plurality of the assembly lugs of the blocks, the protective equipment being provided with weights such that at least part of the protective surface extends in an essentially vertical plane, preferably the protective equipment comprising an impermeable sheet or a net, for example one whose height is greater than the height of the blocks.

According to one embodiment, the invention also provides a use of an above-described floating structure on a body of water to form a protective barrier, in which each block comprises a lower face and an upper face, the lower face being submerged in the body of water while the upper face is above the surface of the water, and in which the protective surface of the protective equipment is at least partially submerged in the body of water.

BRIEF DESCRIPTION OF THE FIGURES

The invention will be better understood and further objects, details, features and advantages thereof will become more clearly apparent in the course of the following description of a plurality of particular embodiments of the invention, which are given solely by way of illustration and without limitation, with reference to the appended drawings.

DESCRIPTION OF EMBODIMENTS

There follows a description of a floating structure 1 comprising one or more rows 2 of floating, modular blocks 3.

Figure 1:
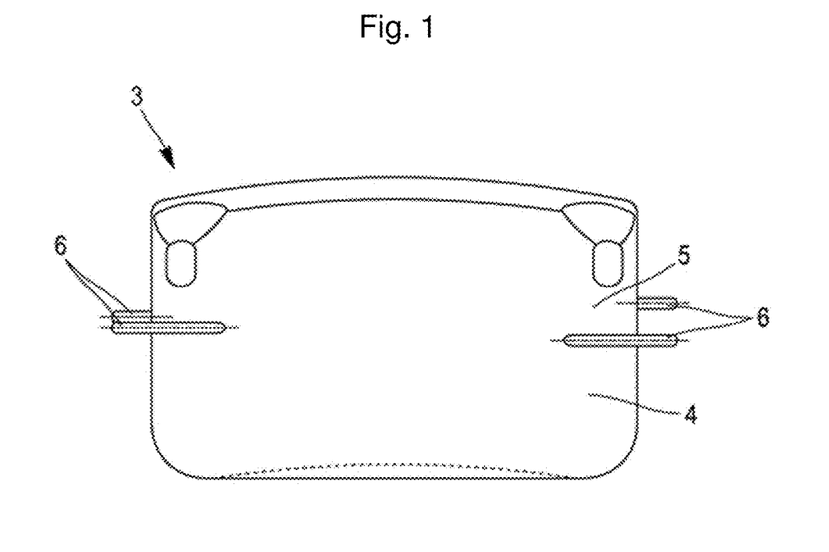
FIG. 1 shows a side view of a floating modular block according to one embodiment.
Figure 2:
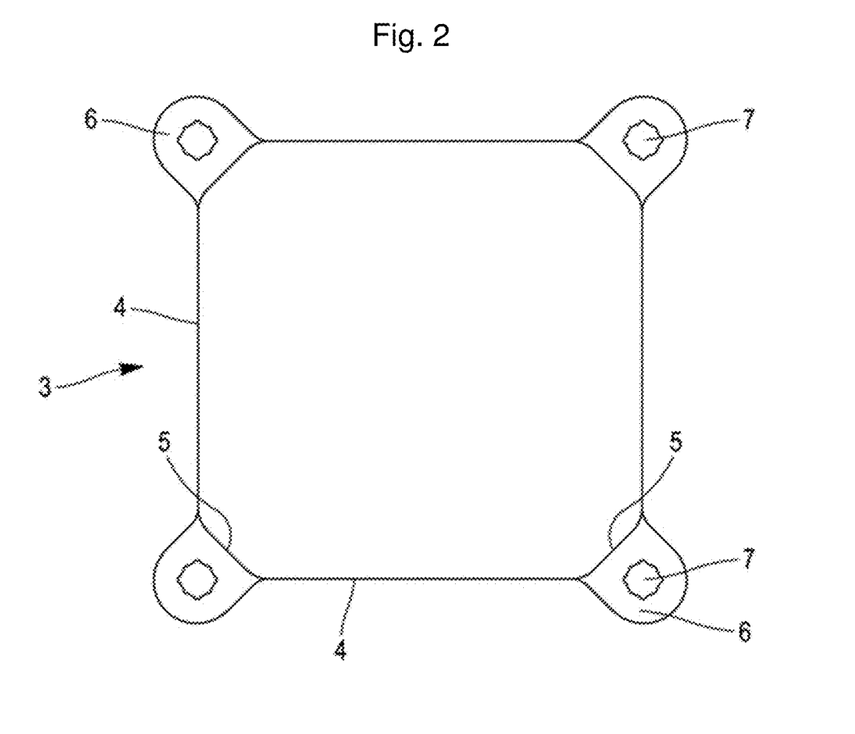
FIG. 2 shows a top view of the floating block of FIG. 1.

FIGS. 1 and 2 show a block 3 of the floating structure 1 according to one embodiment. In this embodiment, the block 3 is in the shape of a rectangular parallelepiped, of square cross section, and comprises an upper face that is intended to be above the surface of the water, a lower face that is intended to be submerged in the body of water, and four peripheral vertical faces 4 that meet at four vertical edges 5. The peripheral vertical faces 4 thus connect the upper face to the lower face. The lower face comprises a concave bottom which allows the block to stick to the surface of the water without slipping.

The vertical edges 5 each comprise an assembly lug 6 in which an assembly system can be received in order to join a block 3 to an adjacent block. In this embodiment, the assembly lugs 6 of a given block 3 are illustrated in particular in FIG. 1, each positioned at different levels of the vertical edge such that one of the assembly lugs 6 of one block 3 can be superposed with the other assembly lugs 6 of another block 3.

The assembly lugs 6 comprise a receptacle 7 that allows an assembly system 8 to pass through the assembly lug 6. Indeed, two adjacent blocks 3 of a given row 2 are joined to one another by superposing an assembly lug 6 of each of the adjacent blocks 3 then by placing an assembly system 8 which passes through the receptacles 7 of the two assembly lugs 6 so as to connect them to one another.

Figure 3:
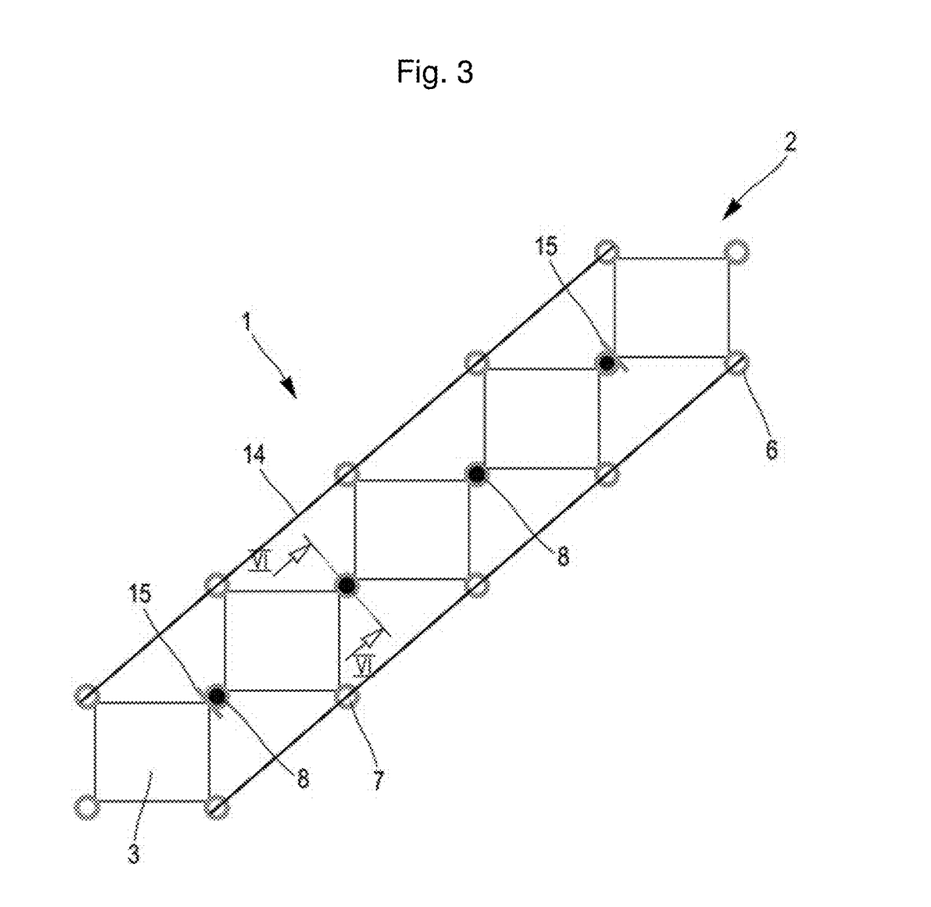
FIG. 3 shows a schematic top view of a floating structure according to a first embodiment, the floating structure consisting of a single row.
Figure 4:
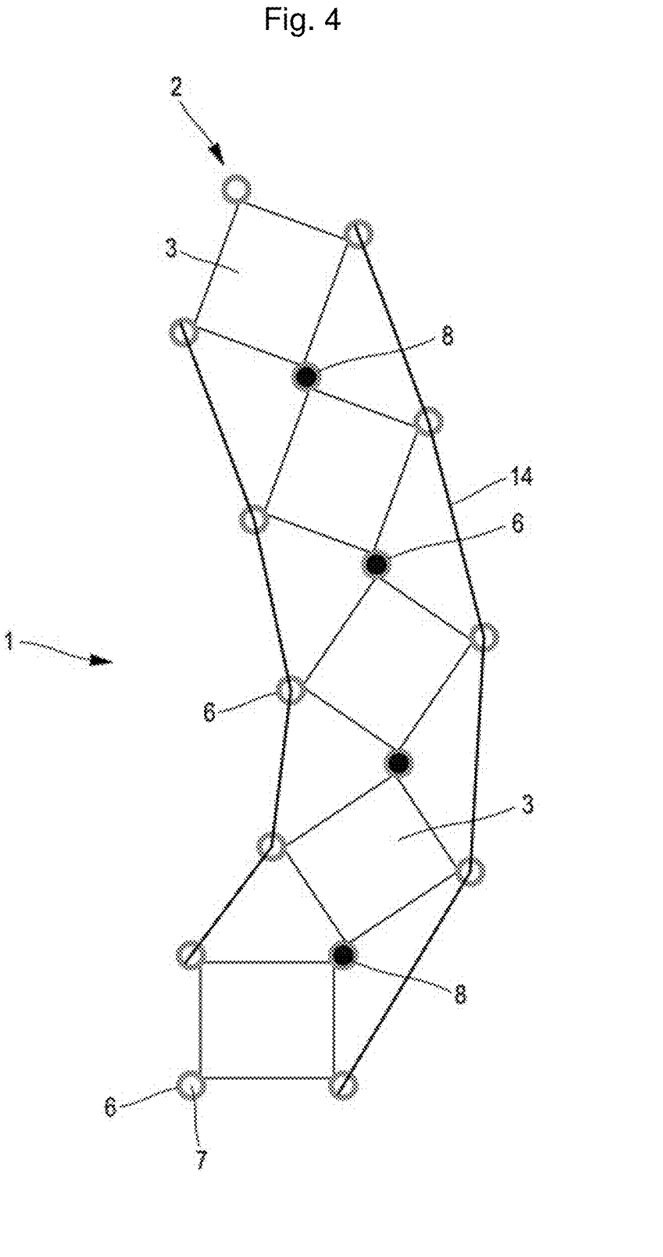
FIG. 4 shows a schematic top view of a floating structure according to a second embodiment, the floating structure consisting of a single row.
Figure 5:
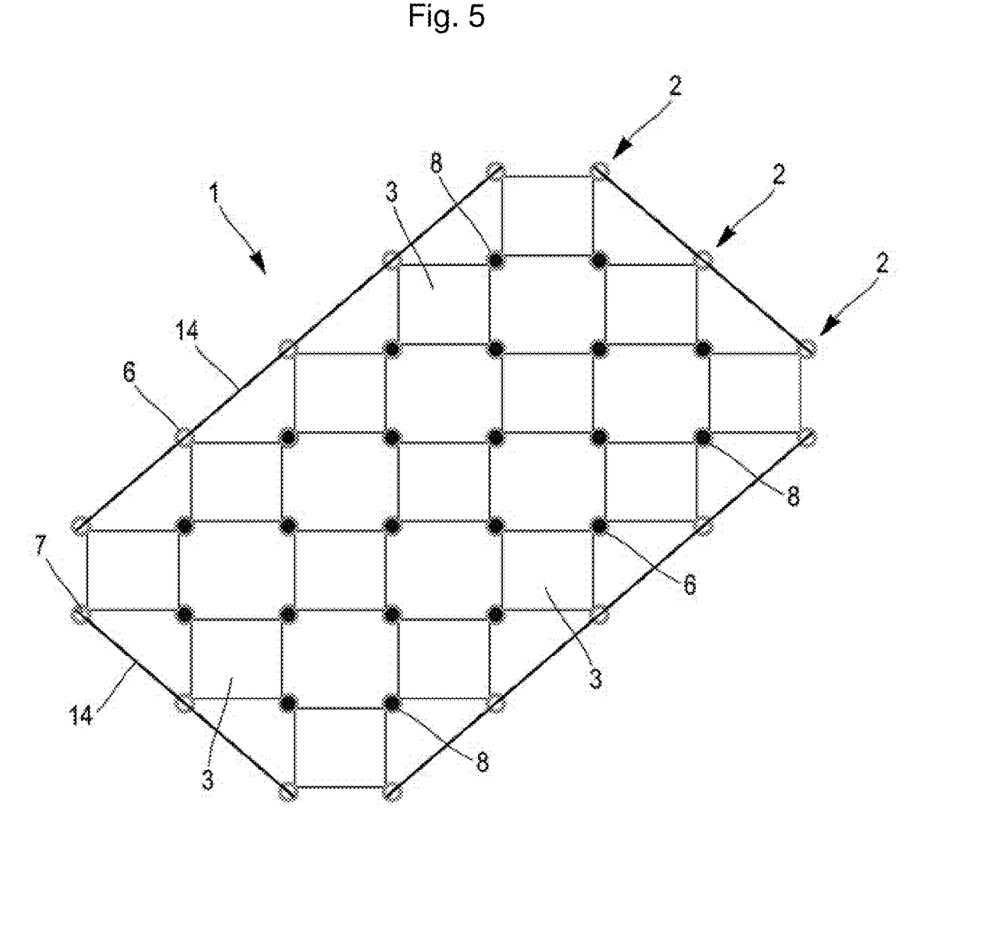
FIG. 5 shows a schematic top view of a floating structure according to a third embodiment, the floating structure consisting of a plurality of parallel rows.

FIGS. 3 to 5 show a floating structure 1 according to a plurality of embodiments.

Indeed, in the representation of FIG. 3, the floating structure 1 consists of a single row 2 comprising a plurality of blocks 3 that are joined to one another so as to form a straight line of blocks.

Thus, the row 2 comprises a plurality of blocks 3 that are joined to one another by assembly systems 8 arranged in two diagonally opposite assembly lugs 6 of each block 3, with the exception of the blocks 3 located at the ends of the row 2, which are joined to a single adjacent block 3. Indeed, and as shown in FIG. 1, a block 3 located between the ends of the row 2 therefore has two adjacent blocks 3 in this row 2. Thus, this block 3 is joined to these adjacent blocks by two of its assembly lugs 6, which are located on two vertical edges 5 separated by a diagonal of the block 3.

The floating structure 1 also comprises two orientation control devices 14 located on either side of the floating structure 1 which in this case consists of a single row 2 of blocks 3. In this case, the orientation control devices 14 are attached to each block 3 of the row 2 by an assembly lug 6 that projects out from the floating structure 1, and this assembly lug 6 not being used to join together two adjacent blocks 3. The length of the orientation control device 14 between two assembly lugs 6 of two adjacent blocks is set so as to obtain the desired orientation between these two blocks 3. The length of the orientation control device 14 is modulated either by using a cord, a cable or a chain and by tensioning the cord, the cable or the chain to the desired length between the assembly lugs 6, or by using a rigid bar of the desired length, it being possible to use a telescopic bar for better adaptability.

Thus, the orientation control device 14 serves to control the orientation of the blocks 3 of the floating structure 1 in pairs so as to control the overall orientation of the structure 1.

The floating structure 1 shown in FIG. 3 also comprises one or more anchoring systems 15 distributed over the length of the floating structure 1. As shown, each anchoring system 15 is attached to the floating structure 1 at the join between two assembly lugs 6 of two adjacent blocks 3. The anchoring systems 15 consist for example of a weighted mass, such as an anchor, and a cord or chain attached at one end to the structure 1 and at the other end to the anchor.

The embodiment of FIG. 4 is similar to the embodiment of FIG. 3. Indeed, FIG. 4 also shows a floating structure 1 consisting of a single row 2 of blocks 3. However, in contrast to FIG. 3, the row 2 is not arranged so as to form a straight line. In the embodiment of FIG. 3, the blocks 3 are oriented with respect to one another by means of the orientation control devices 14 so as to form an angle of 90° between two adjacent blocks, and thus form a straight line. In the embodiment of FIG. 4, the orientation between two adjacent blocks is not equal to 90°, and thus the floating structure 1 of this embodiment forms a curved line.

FIG. 5 shows another embodiment of a floating structure 1. As shown, in this case the floating structure 1 comprises a plurality of rows 2 of blocks 3. Each row 2 is formed as in the preceding embodiments. However, the orientation control devices are attached only to the rows 2 defining the outer perimeter of the floating structure 1. Moreover, each row 2 is joined to an adjacent row 2 by at least one assembly system 8. In the embodiment shown in FIG. 5, each row 2 is attached to an adjacent row by a plurality of assembly systems 8, and thus by a plurality of adjacent blocks 3.

In order to join two adjacent rows 2, at least one assembly system 8 joins two assembly lugs 6, of which one is located on a block 3 of one of the adjacent rows, and the other is located on a block 3 of the other of the adjacent rows. These assembly lugs 6 are assembly lugs 6 which have not been used to join the blocks 3 in each of the rows 2.

In embodiments which have not been shown, the rows 2 may be of different sizes and two adjacent rows may for example be joined by a single assembly system 8.

Figure 6:
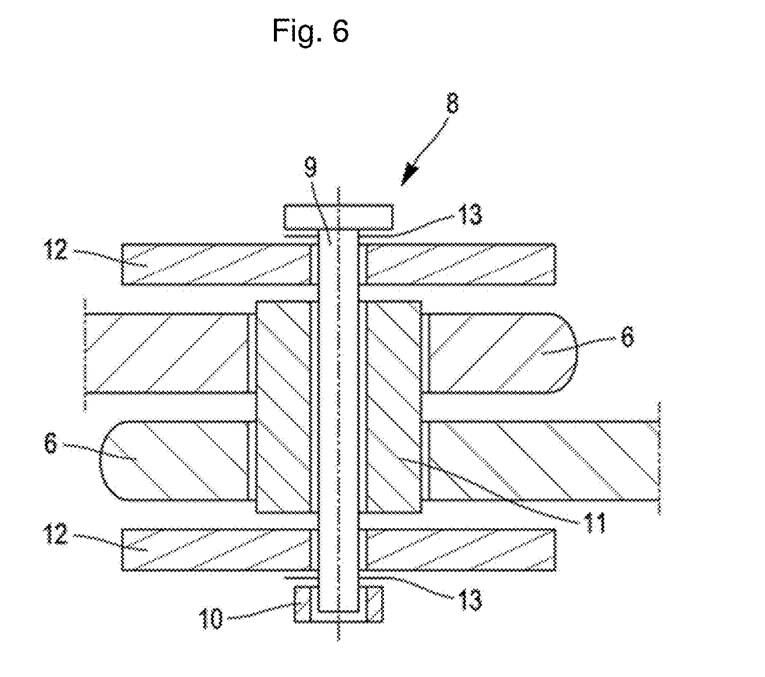
FIG. 6 shows a partial sectional view of the floating structure of FIG. 3 along the line VI-VI.

FIG. 6 shows an assembly system 8 according to one embodiment, which serves for joining two assembly lugs 6 of two adjacent blocks 3. The assembly system 8 passes through the receptacles 7 of the assembly lugs 6 so as to encompass them and clamp them against one another. To that end, the assembly system 8 of the embodiment shown in FIG. 6 comprises a screw 9 and a nut 10 such that the head of the screw 9 and the nut 10 sandwich the two assembly lugs 6 during tightening.

Moreover, the assembly system 8 comprises a cylinder 11 that is placed all around the screw 9 and is also inserted into the receptacles 7. The cylinder 11 has an external diameter that is essentially equal to an internal diameter of the receptacles 7 so as to match the shape of the receptacle while allowing the cylinder 11 to rotate with respect to the assembly lugs 6. Moreover, the cylinder 11 limits the radial movement of the assembly system 8 in the assembly lugs 6. A large washer 12 is placed between the screw head and one of the assembly lugs 6, and another large washer 12 is placed between the nut and the other of the assembly lugs 6. The large washers 12 have an external diameter that is greater than an external diameter of the receptacles 7 such that, during tightening, the clamping force of the screw/nut system acts on the assembly lugs 6 and not only on the cylinder 11. The assembly system 8 may also comprise small washers 13 whose diameter is equivalent to the diameter of the screw head and of the nut 10, the small washers 13 being placed between the large washers 12 and the screw head or the nut 10.

In an embodiment which is not shown, the screw may be replaced with a simple threaded rod equipped with a second nut at the other end. Moreover, the cylinder 11 may be optional if the screw 9 or the threaded rod has a diameter that is appropriate for the receptacle 7.

Figure 7:
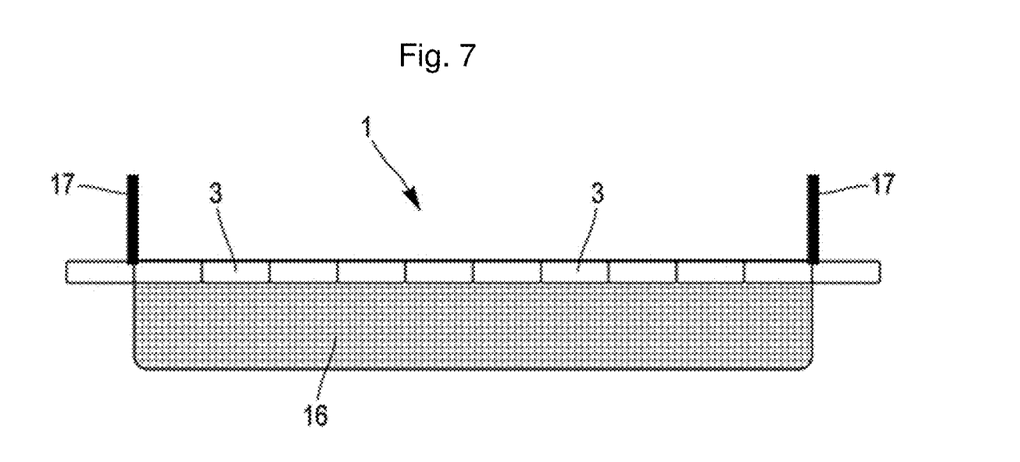
FIG. 7 shows a schematic side view of a floating structure comprising a piece of protective equipment, according to one embodiment.

FIG. 7 shows a floating structure 1 that comprises a piece of protective equipment 16. The protective equipment 16 is attached to a plurality of assembly lugs 6 all along the floating structure 1. The assembly lugs 6 may be assembly lugs 6 that project out from the floating structure 1, or assembly lugs 6 used for joining blocks together. In the example shown, the protective equipment 16 is a net. Moreover, in this embodiment, two assembly systems 8 of the floating structure 1 comprise, on an upper part, a stanchion 17 provided with at least one eyelet that is configured so as to constitute an attachment point for the net. The net can thus be attached solely to the stanchions, or be attached to the assembly lugs 6, or use a combination of the two attachments. This type of stanchion 17 is described in particular in application document FR2960210.

Floating structures 1 of the type described above may be used in numerous applications, such as anti-shark barriers, anti-intrusion barriers, anti-pollution barriers (for example hydrocarbon leaks), anti-algae barriers, floating wavescreen and swell attenuator assemblies, platforms for supporting photovoltaic panels, structures for aquaculture and shellfish farming, or platforms for various constructions on water.

This type of floating structure 1 has, in particular owing to these voids, an advantage of aeration for platforms supporting photovoltaic panels, and thus better cooling of the panels, while reducing the impact on fauna and flora of a body of water.

Although the invention has been described in connection with a plurality of particular embodiments, it is obvious that it is in no way limited thereby and that it comprises all technical equivalents of the resources described and also combinations thereof if these fall within the scope of the invention.

The use of the verb "have", "comprise" or "include" and of the conjugated forms thereof does not exclude the presence of elements or steps other than those stated in a claim.

In the claims, any reference sign between parentheses should not be interpreted as a limitation on the claim.

The invention claimed is:

1. Floating structure (1) comprising at least one row (2) of floating rectangular parallelepipedal modular blocks (3), one block (3) comprising four vertical peripheral faces that meet at four vertical edges, each vertical edge bearing an assembly lug (6) in which an assembly system (8) can be received in order to join said block (3) to one or more adjacent blocks (3),
   said or each row (2) comprising a plurality of blocks (3) joined to one another by assembly systems (8) arranged in two diagonally opposite assembly lugs (6) of each block (3), with the exception of two end blocks (3),
   said floating structure (1) being configured such that each block (3) is joined to an adjacent block (3) by a single assembly lug (6),
   in which two adjacent, joined-together blocks (3) of a row (2) have two superposed assembly lugs (6), and in which the assembly lugs (6) have a receptacle (7), with the assembly system (8) passing through the receptacles (7) of the superposed assembly lugs (6) in order to join the blocks (3) to one another,
   in which blocks (3) located on an outer perimeter of the floating structure (1) are connected to one another by an orientation control device (14) comprising a tensioned element, the orientation control device (14) being secured to the blocks (3) of the outer perimeter on an assembly lug (6) that projects out from the floating structure (1), and the orientation control device (14) being configured to adjust a general orientation of the floating structure (1),
   in which the assembly system (8) comprises a nut (10) and a screw (9) provided with a screw head, the screw (9) passing through the two receptacles (7) of the assembly lugs (6) such that the screw head and the nut (10) sandwich the assembly lugs (6), and
   in which the assembly system (8) comprises a cylinder (11) placed around the screw at the level of the assembly lugs (6), the cylinder (11) having an external diameter that is smaller than an internal diameter of the receptacles (7) so as to allow sliding between the cylinder (11) and a peripheral wall of the receptacle (7).

2. Floating structure (1) according to claim 1, in which the assembly system (8) is configured to permit rotation about a vertical axis at the connection between the two adjacent blocks (3).

3. Floating structure (1) according to claim 1, in which the cylinder (11) has a length greater than a thickness of the superposed two assembly lugs (6) and the assembly system (8) comprises at least one washer (12) positioned between the screw head and a first end of the cylinder (11), and at least one washer (12) positioned between the nut and a second end of the cylinder (11), the washers (12) having an external diameter that is greater than the internal diameter of the receptacle (7).

4. Floating structure (1) according to claim 1, in which the orientation control device (14) is located on at least two opposite edges of the outer perimeter of the floating structure (1).

5. Floating structure (1) according to claim 1, in which the orientation control device (14) comprises at least one cord or at least one cable or at least one chain.

6. Floating structure (1) according to claim 1, in which the assembly lugs (6) of each block (3) consist of a first assembly lug (6), a second assembly lug (6), a third assembly lug (6) that is diagonally opposite the first assembly lug (6) and a fourth assembly lug (6) that is diagonally opposite the second assembly lug (6), and in which the first assembly lug (6) and the second assembly lug (6) are positioned at a different height, in the vertical direction, to the third assembly lug (6) and the fourth assembly lug (6) such that the first assembly lug (6) or the second assembly lug (6) of a block (3) can be superposed with the third assembly lug (6) or the fourth assembly lug (6) or an adjacent block (3).

7. Floating structure (1) according to claim 1, in which the floating structure (1) comprises a plurality of parallel rows (2) of blocks (3), two adjacent rows (2) being joined to one another by at least one attachment system, the attachment system joining two assembly lugs (6), one being located on a block (3) of one of the adjacent rows (2) and the other on a block (3) of the other of the adjacent rows (2), said two assembly lugs (6) being different assembly lugs (6) to those used for joining the blocks (3) of a given row (2).

8. Floating structure (1) according to claim 1, in which the floating structure (1) comprises an anchoring system (15) that serves to anchor the floating structure (1) to a seabed, the anchoring system (15) being attached to an assembly lug (6) of the floating structure (1).

9. Floating structure (1) consisting of a single row (2) of floating rectangular parallelepipedal modular blocks (3), one block (3) comprising four vertical peripheral faces that meet at four vertical edges, each vertical edge bearing an assembly lug (6) in which an assembly system (8) can be received in order to join said block (3) to one or more adjacent blocks (3),
   said or each row (2) comprising a plurality of blocks (3) joined to one another by assembly systems (8) arranged in two diagonally opposite assembly lugs (6) of each block (3), with the exception of two end blocks (3), said floating structure (1) being configured such that each block (3) is joined to an adjacent block (3) by a single assembly lug (6), in which two adjacent, joined-together blocks (3) of a row (2) have two superposed assembly lugs (6), and in which the assembly lugs (6) have a receptacle (7), with the assembly system (8) passing through the receptacles (7) of the superposed assembly lugs (6) in order to join the blocks (3) to one another, in which blocks (3) located on an outer perimeter of the floating structure (1) are connected to one another by an orientation control device (14) comprising a tensioned element, the orientation control device (14) being secured to the blocks (3) of the outer perimeter on an assembly lug (6) that projects out from the floating structure (1), and the orientation control device (14) being configured to adjust a general orientation of the floating structure (1), and in which each block is connected to at most two adjacent blocks.

10. Floating structure (1) comprising at least one row (2) of floating rectangular parallelepipedal modular blocks (3), one block (3) comprising four vertical peripheral faces that meet at four vertical edges, each vertical edge bearing an assembly lug (6) in which an assembly system (8) can be received in order to join said block (3) to one or more adjacent blocks (3), said or each row (2) comprising a plurality of blocks (3) joined to one another by assembly systems (8) arranged in two diagonally opposite assembly lugs (6) of each block (3), with the exception of two end blocks (3), said floating structure (1) being configured such that each block (3) is joined to an adjacent block (3) by a single assembly lug (6), in which two adjacent, joined-together blocks (3) of a row (2) have two superposed assembly lugs (6), and in which the assembly lugs (6) have a receptacle (7), with the assembly system (8) passing through the receptacles (7) of the superposed assembly lugs (6) in order to join the blocks (3) to one another, in which blocks (3) located on an outer perimeter of the floating structure (1) are connected to one another by an orientation control device (14) comprising a tensioned element, the orientation control device (14) being secured to the blocks (3) of the outer perimeter on an assembly lug (6) that projects out from the floating structure (1), and the orientation control device (14) being configured to adjust a general orientation of the floating structure (1), and in which the structure comprises a piece of protective equipment (16) extending in a longitudinal direction of the at least one row (2), and forming a protective surface, the protective equipment (16) being attached to a plurality of the assembly lugs (6) of the blocks (3), the protective equipment (16) being provided with weights such that at least part of the protective surface extends in an essentially vertical plane.

11. Use of a floating structure (1) according to claim 10 on a body of water to form a protective barrier, in which each block (3) comprises a lower face and an upper face, the lower face being submerged in the body of water while the upper face is above the surface of the water, and in which the protective surface of the protective equipment (16) is at least partially submerged in the body of water.

12. Floating structure (1) according to claim 10, in which the protective equipment (16) comprises an impermeable sheet or a net whose height is greater than the height of the blocks (3).

\* \* \* \* \*